E. L. DUNN.
CHAIN CARRYING ATTACHMENT FOR MOTOR VEHICLES.
APPLICATION FILED JUNE 27, 1916.

1,374,556.

Patented Apr. 12, 1921.
3 SHEETS—SHEET 1.

Inventor
Edward L. Dunn.
By Southgate & Southgate
Attorneys

E. L. DUNN.
CHAIN CARRYING ATTACHMENT FOR MOTOR VEHICLES.
APPLICATION FILED JUNE 27, 1916.
1,374,556.
Patented Apr. 12, 1921.
3 SHEETS—SHEET 2.
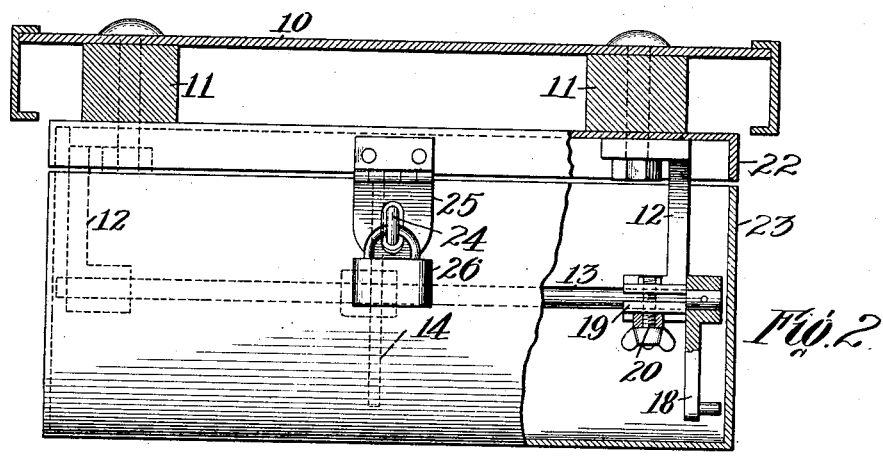
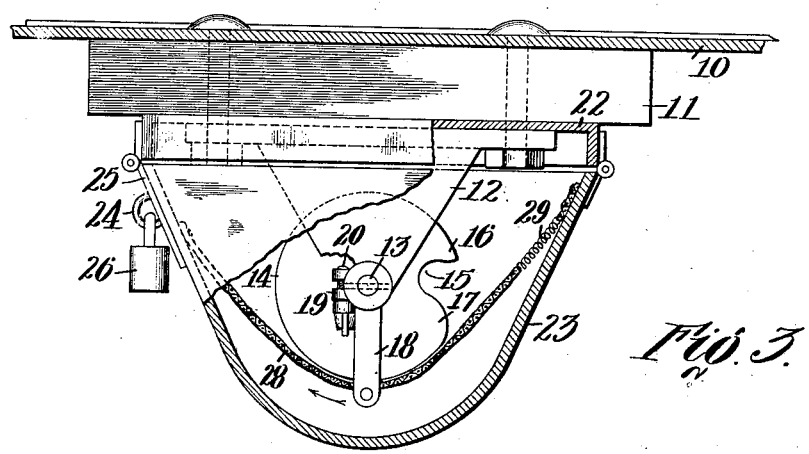
Inventor
Edward L. Dunn.
By Southgate & Southgate
attorneys E. L. DUNN.
CHAIN CARRYING ATTACHMENT FOR MOTOR VEHICLES.
APPLICATION FILED JUNE 27, 1916.
1,374,556.
Patented Apr. 12, 1921.
3 SHEETS—SHEET 3.
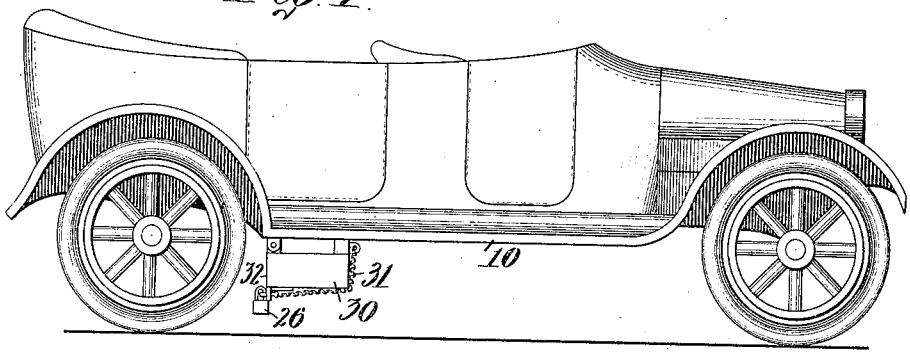
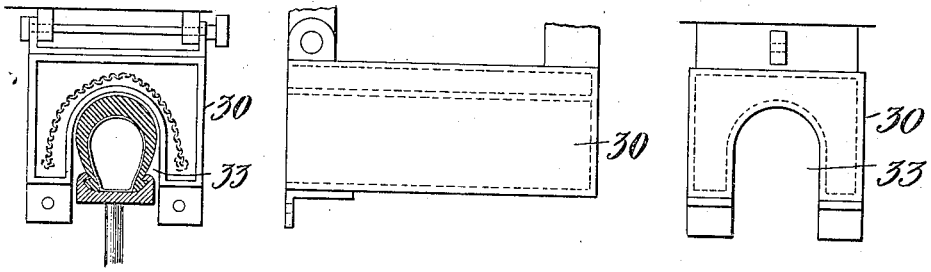
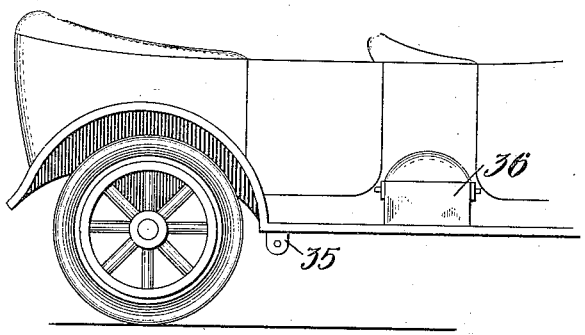
Inventor
Edward L. Dunn.
By Southgate & Southgate
Attorneys

UNITED STATES PATENT OFFICE.

EDWARD L. DUNN, OF WORCESTER, MASSACHUSETTS.

CHAIN-CARRYING ATTACHMENT FOR MOTOR-VEHICLES.

1,374,556.   Specification of Letters Patent.   Patented Apr. 12, 1921.

Application filed June 27, 1916. Serial No. 106,249.

*To all whom it may concern:*

Be it known that I, EDWARD L. DUNN, a citizen of the United States, residing at Worcester, in the county of Worcester and State of Massachusetts, have invented a new and useful Chain-Carrying Attachment for Motor-Vehicles, of which the following is a specification.

This invention relates to a device for carrying an anti-slipping chain or other means near the wheel of an automobile and also for providing for assisting in attaching the same to the wheel and in some cases removing it therefrom.

The principal objects of the invention are to provide a suitable carrier for an anti-slipping chain or the like; to locate it in a convenient position; to provide means whereby the chain can be applied to the tire with a minimum of trouble; to provide means whereby the chain is prevented from being tangled; to provide means whereby the chain can be attached while the wheel is in a mud hole without the necessity of handling the chain; to provide means whereby two or if desired four chains can be applied simultaneously in much less time than one chain can be applied ordinarily; to provide a locking means for preventing the theft of the chain preferably suitable also for use for attaching the chain to the wheel; to provide for preventing the chain from rattling; to provide a tension on the chain so as to take up slack, lay the chain out on the tire in its proper condition and avoid the usual tugging to get it into place; and to provide a device which can be attached to any car or without change in principle can be built into the mud guard or step. Other objects and advantages of the invention will appear hereinafter.

Reference is to be had to the accompanying drawings, in which—

Fig. 2 is a rear elevation of the attachment with parts appearing in section;

Fig. 3 is a side view of the same with parts appearing in section;

Fig. 4 is a side view of a car showing another embodiment of the invention;

Fig. 5 is a side view of the attachment on enlarged scale;

Fig. 6 is an end view of the same;

Fig. 7 is a plan showing the device in its operative position applying the tire to the wheel, and Fig. 8 is a side view showing another modification.

Figure 1:
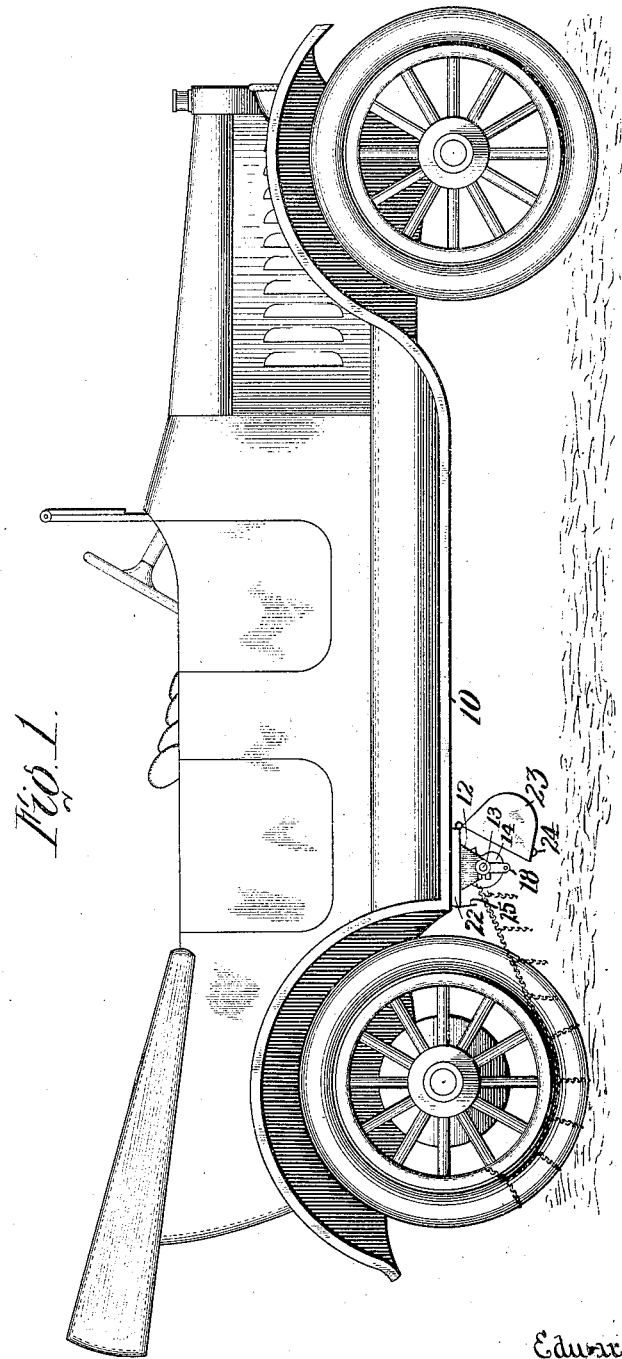
Figure 1 is a side view of an automobile showing a preferred embodiment of this invention applied thereto.

This invention is designed to overcome the difficulties met with in the use of anti-slipping chains and the like. These chains are of course used when there is a lot of mud or water and after having once been used they are always dirty and at all times unwieldy. They are easily tangled up and it is customary when taking them off to throw them down carelessly, thus increasing the difficulty from tangling. I find also that it is a very difficult matter to find out what has caused the twisting of the chain and that much time has to be spent in straightening it out. They are also likely not to be at hand when needed, are easily stolen, as there is ordinarily no protection against this, and there are occasions, as for example when the wheel is in a mud hole, when it is practically impossible to get them on.

Referring now especially to Figs. 1, 2 and 3 of the drawings, an automobile of well-known type, is shown having a mudguard 10 to which the device is attached. For this purpose the mud guard is shown as provided underneath it with a pair of wooden blocks 11 to which brackets 12 are secured. These parts are shown as located directly in front of one of the rear wheels, and as far from the ground as possible in view of the make of the car. I am aware, however, that the device can be located at almost any point around the wheel except near the ground, but I prefer to locate it at this place because it furnishes a convenient location for the operator. It is where it is not in the way, and as will be seen later the device delivers the chain out in proper condition to bring it down under the wheel quickly so that it will assist in taking the car out of a mud hole or the like.

These brackets support a shaft 13, which shaft is provided with a central disk 14. This disk has a notch 15 in its circumference provided with a sharp point 16 on one side, and a rounded projection 17 on the other. On the shaft is a handle 18 by which the shaft can be turned. One of these brackets is shown as provided with a split bearing 19 for the shaft, having projections thereon adapted to be connected together by an adjusting screw 20. This is for the purpose of regulating the tension on the shaft, the object of which will appear later.

These parts are shown as inclosed in a casing formed of a stationary part 22 secured to the blocks 11 above the brackets 12, and a pivoted member 23 shaped to inclose the parts when brought to the closed position shown in Figs. 2 and 3. For the purpose of locking this casing it is shown as provided with a staple 24, loop 25 and padlock 26.

For a purpose to be described a flexible band 28 is shown having one end secured to the movable side of the cover 23 and the other end near the pivot thereof and connected therewith by a spring 29.

In the use of the device when it is desired to place the chain on the windlass formed of the handle 18, shaft 13 and disk 14, one of the cross chains of the anti-slipping device is simply placed in the notch 15, and the handle turned in the direction of the arrow in Fig. 3. Obviously the hook 16 engages this cross chain and forces it to turn around the shaft with the disk while the disk itself serves to receive the cross chains one at a time as they are wound up, and to separate the longitudinal chains of the anti-skidding device. In this way the tangling of the chain is substantially prevented. It will be understood that normally this chain is spread out in a convenient place under the windlass and wound up in this way, although it can be wound directly off the wheel under certain circumstances. This can be done by simultaneously running the tire forward, or backward according to the way in which the chain is put on it, and turning the windlass, but I prefer ordinarily to get the chain off the tire in the usual way, and then wind it on the windlass as a separate operation.

When the chain is all wound up it is not necessary to fasten it in any way at its free end, and the only thing required is to close the cover 23 and then lock it in position. When the flexible member 28 is used this will come against the chain as the cover is closed in and put a tension on it, so that it will neither rattle nor unwind as the car is operating. The tension on the shaft 13 can also be increased by means of the bolt 20 so as to prevent this shaft from turning, if desired. It will be understood that while the chain is being wound up this tension is released.

When it is desired to apply the chain the casing is opened, thus automatically releasing the tension from the band 28. The tension on the shaft 13 from the screw 20 is then adjusted to the desired degree and the free end of the chain brought out into contact with the tire. The two loose ends of the chain are preferably brought around the tire and connected together by means of the usual links with which they are provided. They can be secured by means of the padlock 26 which will thus be utilized while the windlass is not in use for holding the chain. Therefore this adds to the certainty of not having the padlock lost when it is wanted.

The only thing that is necessary now is to move the car forward under its own power or otherwise. As the wheel turns the chain is brought around with it, as indicated in Fig. 1, and on account of the tension on the shaft 13 it is laid out smoothly and accurately upon it, and when it is all on the tire, it will be found that it is in proper position throughout its length because it is not tangled up to start with, and it has had no chance to catch in any way while being put on. The end which was placed in the notch 15 comes away from the windlass automatically because of the fact that there is nothing to catch it as it comes around on the final turn. This is accomplished by the shape of the projection 17. When the end of the chain comes off the windlass in this way, the car is stopped and the end fastened to the other end of the chain, this being the only manipulation required on the part of the operator after locking the advance end to the wheel.

It will be seen from this that not only can all four chains be applied simultaneously if a machine is equipped with four of these devices, but the operation is very greatly facilitated and it is possible while the wheels are in a mud hole to apply the chain without any more trouble than at any other point, and the chain will be found in position to take the car out of the hole. Furthermore the passengers do not have to leave their seats.

Although the form described is the preferred form of the invention, I am aware of the fact that the invention can be carried out in other ways. In Figs. 4, 5, 6 and 7 no windlass is shown, but under the mud guard is pivoted a box 30. This is normally located in horizontal position, as shown in Figs. 4 and 5 by means of a chain 31 going around the end of it, and having a loop on the end extending into the passage in the cover 32 of the box. The padlock 26 is shown for locking them. When the chain is being applied or removed this box is located with its open end at the top and the chain is attached to the wheel as before, but in this case the car must be run backward to bring the chain around or at least the wheel rotated in that direction. This box is hollowed out at its rear or bottom side at 33 so that the cross chains will practically surround it at this time. When the chain is to be removed from the wheel it can be loosened all around and its forward end placed in the box and then the car run forward until the chain is dropped in or it can be placed in by hand.

In the form shown in Fig. 8 an arrangement on the principle of that shown in the first three figures is indicated, but the brackets 35 are only for use in holding the windlass while being operated. After the chain is wound up on the windlass the latter with the chain is removed from these brackets and placed in a box 36 carried above the mud guard.

Although I have illustrated and described only a hand operated form of the invention and shown it as applied to an ordinary kind of mud guard I am aware of the fact that many modifications can be made therein by any person skilled in the art without departing from the scope of the invention as expressed in the claims. Therefore I do not wish to be limited to all the details of construction herein disclosed or to the application of the invention to any particular kind of automobile shown in the drawings, but what I do claim is:—

1. In an attachment for a vehicle, the combination of a casing, means within the casing for holding an anti-slipping device, and yielding means for engaging the anti-slipping device while on said holding means and preventing its rattling.

2. In a device of the character described, the combination with a wheel, of a shaft adjacent thereto, a non-skid chain adapted to be wound on the shaft and having means at its end for attachment to the wheel, and means for applying a constant uniform tension to the shaft to keep the chain taut between the surface of the wheel and said shaft while the chain is being wound on the wheel by the rotation.

3. A tire-chain container, comprising a housing adapted to be mounted on a motor car, there being a drum provided in said housing, and means for winding a tire-chain on said drum comprising a member on the drum for engaging the cross chain of said tire chain and turning it with the drum in one direction only.

4. In an attachment for a vehicle, the combination of a windlass mounted thereon for an anti-slipping device, a casing for surrounding the windlass and the anti-slipping device thereon, and yielding means inside the casing for engaging the anti-slipping device and preventing the rattling thereof.

5. In an attachment for a vehicle, the combination of a windlass on which an anti-slipping device is adapted to be wound, a flexible band passing around one side of the windlass to engage the anti-slipping device when wound up thereon, and yielding means for holding the band to keep the anti-slipping device in position and prevent rattling.

6. In a device of the character described, the combination of a rotatable shaft, and means on the shaft for engaging a cross chain of a non-skid chain and winding the chain up on the shaft when the shaft is turned.

7. In an attachment for a vehicle, the combination of a shaft supported thereby, a handle on the shaft for turning it, a disk near the center of said shaft having a notch therein for receiving a cross chain of an anti-slipping tire chain, whereby upon turning the shaft after the cross chain is introduced into the notch the tire chain will be wound upon the shaft.

8. In an attachment for a vehicle, the combination of a shaft supported thereby, a handle on the shaft for turning it, a disk near the center of said shaft having a notch therein for receiving a cross chain of an anti-slipping tire chain, whereby upon turning the shaft after the cross chain is introduced into the notch the tire chain will be wound upon the shaft, said disk serving to divide the space along the shaft for receiving one longitudinal chain on one side and the other on the other side.

9. In an attachment for a vehicle, the combination of a shaft supported thereby, a handle on the shaft for turning it, a disk near the center of said shaft having a notch therein for receiving a cross chain of an anti-slipping tire chain, whereby upon turning the shaft after the cross chain is introduced into the notch the tire chain will be wound upon the shaft, said notch having a sharp edge on one side, and a blunt edge on the other, whereby when turned in one direction the cross chain will be caused to move with it and when turned in the other direction will be permitted to slip out of the notch easily.

In testimony whereof I have hereunto affixed my signature.

EDWARD L. DUNN.